(12) United States Patent
Duesler et al.

(10) Patent No.: US 6,211,668 B1
(45) Date of Patent: Apr. 3, 2001

(54) MAGNETIC POSITION SENSOR HAVING OPPOSED TAPERED MAGNETS

(75) Inventors: John S. Duesler, Buchanan, MI (US); Craig A. Jarrard, Middlebury, IN (US); Robert L. Newman, Osceola, IN (US); Ronald C. Nonnenmacher, Elkhart, IN (US); David S. Pfaffenberger, Mishawaka, IN (US); David J. Miller, Granger, IN (US)

(73) Assignee: CTS, Elkhart, IN (US)

( * ) Notice: Subject to any disclaimer, the term of this patent is extended or adjusted under 35 U.S.C. 154(b) by 0 days.

(21) Appl. No.: 09/208,296

(22) Filed: Dec. 9, 1998

(51) Int. Cl.[7] ....................................................... G01B 7/14
(52) U.S. Cl. ................. 324/207.2; 324/207.25; 338/32 H
(58) Field of Search ............................ 324/207.2, 207.21, 324/207.22, 207.24, 207.25, 173, 174; 338/32 R, 32 M; 361/149

(56) References Cited

U.S. PATENT DOCUMENTS

| 5,493,216 | * | 2/1996 | Asa | 324/207.2 |
| 5,557,493 | * | 9/1996 | Ross | 361/149 |
| 5,757,179 | * | 5/1998 | McCurley | 324/207.2 |

FOREIGN PATENT DOCUMENTS

| 19715991 | 2/1998 | (DE) . |
| 0558364A1 | 9/1993 | (EP) . |
| 0907068A1 | 4/1999 | (EP) . |

\* cited by examiner

*Primary Examiner*—Christine Oda
*Assistant Examiner*—Subhash A Zaveri
(74) *Attorney, Agent, or Firm*—Mark P. Bourgeois; John E. Gibson

(57) ABSTRACT

In accordance with the present invention, a non-contacting position sensor using bipolar tapered magnets is provided. A non-contacting position sensor in accordance with the preferred embodiment uses a pole piece having a first plate and a second plate. Four magnets are affixed to the first plate and second plate. Each magnet has a thick end and a thin end. Two magnets generate a linearly varying magnetic field having a first polarity, while the other two magnets generate a linearly varying magnetic filed having a second polarity. An air gap is formed in the space between the four magnets. A magnetic flux sensor is positioned within the air gap. The component whose position is to be monitored is rigidly attached to either the pole piece or the magnetic flux sensor, causing the magnetic flux sensor to move relative to the magnets within the air gap as the component moves. A varying magnetic field is detected by the magnetic flux sensor, resulting in a signal from the magnetic flux sensor that varies according to its position relative to the four magnets. The signal from the magnetic flux sensor is used to provide an indication of the position of the component to be monitored.

32 Claims, 5 Drawing Sheets

MAGNETIC POSITION SENSOR HAVING OPPOSED TAPERED MAGNETS

BACKGROUND OF THE INVENTION

I. Technical Field

This invention relates, in general, to non-contacting position sensors. More particularly, this invention relates to the magnetic configuration of non-contacting position sensors utilizing Hall effect devices, particularly those used in automotive environments.

II. Background Art

Electronic devices are an increasingly ubiquitous part of everyday life. Electronic devices and components are presently integrated in a large number of products, including products traditionally thought of as primarily mechanical in nature, such as automobiles. This trend is almost certain to continue. To successfully integrate electronic and mechanical components, some type of interface between the two technologies is required. Generally this interface is accomplished using devices such as sensors and actuators.

Position sensing is used to electronically monitor the position or movement of a mechanical component. The position sensor produces an electrical signal that varies as the position of the component in question varies. Electrical position sensors are an important part of innumerable products. For example, position sensors allow the status of various automotive parts to be monitored and controlled electronically.

A position sensor must be accurate, in that it must give an appropriate electrical signal based upon the position measured. If inaccurate, a position sensor will hinder the proper evaluation and control of the position of the component being monitored.

A position sensor must also be adequately precise in its measurement. The precision needed in measuring a position will obviously vary depending upon the particular circumstances of use. For some purposes only a rough indication of position is necessary, for instance, an indication of whether a valve is mostly open or mostly closed. In other applications more precise indication of position may be needed.

A position sensor must also be sufficiently durable for the environment in which it is placed. For example, a position sensor used on an automotive valve will experience almost constant movement while the automobile is in operation. Such a position sensor must be constructed of mechanical and electrical components which are assembled in such a manner as to allow it to remain sufficiently accurate and precise during its projected lifetime, despite considerable mechanical vibrations and thermal extremes and gradients.

In the past, position sensors were typically of the "contact" variety. A contacting position sensor requires physical contact to produce the electrical signal. Contacting position sensors typically consist of potentiometers to produce electrical signals that vary as a function of the component's position. Contacting position sensors are generally accurate and precise. Unfortunately, the wear due to contact during movement of contacting position sensors has limited their durability. Also, the friction resulting from the contact can result in the sensor affecting the operation of the component. Further, water intrusion into a potentiometric sensor can disable the sensor.

One important advancement in sensor technology has been the development of non-contacting position sensors. As a general proposition, a non-contacting position sensor ("NPS") does not require physical contact between the signal generator and the sensing element. As presented here, an NPS utilizes magnets to generate magnetic fields that vary as a function of position and devices to detect varying magnetic fields to measure the position of the component to be monitored. Often, a Hall effect device is used to produce an electrical signal that is dependent upon the magnitude and polarity of the magnetic flux incident upon the device. The Hall effect device may be physically attached to the component to be monitored and move relative to the stationary magnets as the component moves. Conversely, the Hall effect device may be stationary with the magnets affixed to the component to be monitored. In either case, the position of the component to be monitored can be determined by the electrical signal produced by the Hall effect device.

The use of an NPS presents several distinct advantages over the use of the contacting position sensor. Because an NPS does not require physical contact between the signal generator and the sensing element, there is less physical wear during operation, resulting in greater durability of the sensor. The use of an NPS is also advantageous because the lack of any physical contact between the items being monitored and the sensor itself results in reduced drag upon the component by the sensor.

While the use of an NPS presents several advantages, there are also several disadvantages that must be overcome in order for an NPS to be a satisfactory position sensor for many applications. Magnetic irregularities or imperfections may compromise the precision and accuracy of an NPS. The accuracy and precision of an NPS may also be affected by the numerous mechanical vibrations and perturbations likely be to experienced by the sensor. Because there is no physical contact between the item to be monitored and the sensor, it is possible for them to be knocked out of alignment by such vibrations and perturbations. A misalignment will result in the measured magnetic field at any particular location not being what it would be in the original alignmnent. Because the measured magnetic field will be different than that when properly aligned the perceived position will be inaccurate. Linearity of magnetic field stength and the resulting signal is also a concern.

Some of these challenges to the use of an NPS have been addressed existing devices, most notably the device of U.S. Pat. No. 5,712,561 issued to McCurley, et al and assigned to the CTS Corporation, herein incorporated by reference. There remains, however, a continuing need for a more precise determination of physical location of an item based upon the measured magnetic field at a location. Most particulary, a new type of non-contacting position sensor is needed which displays minimal deviations due to changes in temperature and maximum linearity of the magnetic field.

SUMMARY OF THE INVENTION

The present invention overcomes the limitations of the prior art to allow for greater accuracy and precision in a non-contacting position sensor. In particular, the present invention allows for decreased deviations with temperature and for increased linearity over preexisting non-contacting position sensors. These advantages are accomplished by using an arrangement of bipolar tapered magnets to create a non-contacting position sensor with increased magnetic gain and decreased variations due to temperature changes. A non-contacting position sensor in accordance with the present invention displays improved linearity in response while being inexpensive and relatively simple to manufacture.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DESCRIPTION OF THE PREFERRED EMBODIMENT

Figure 1:
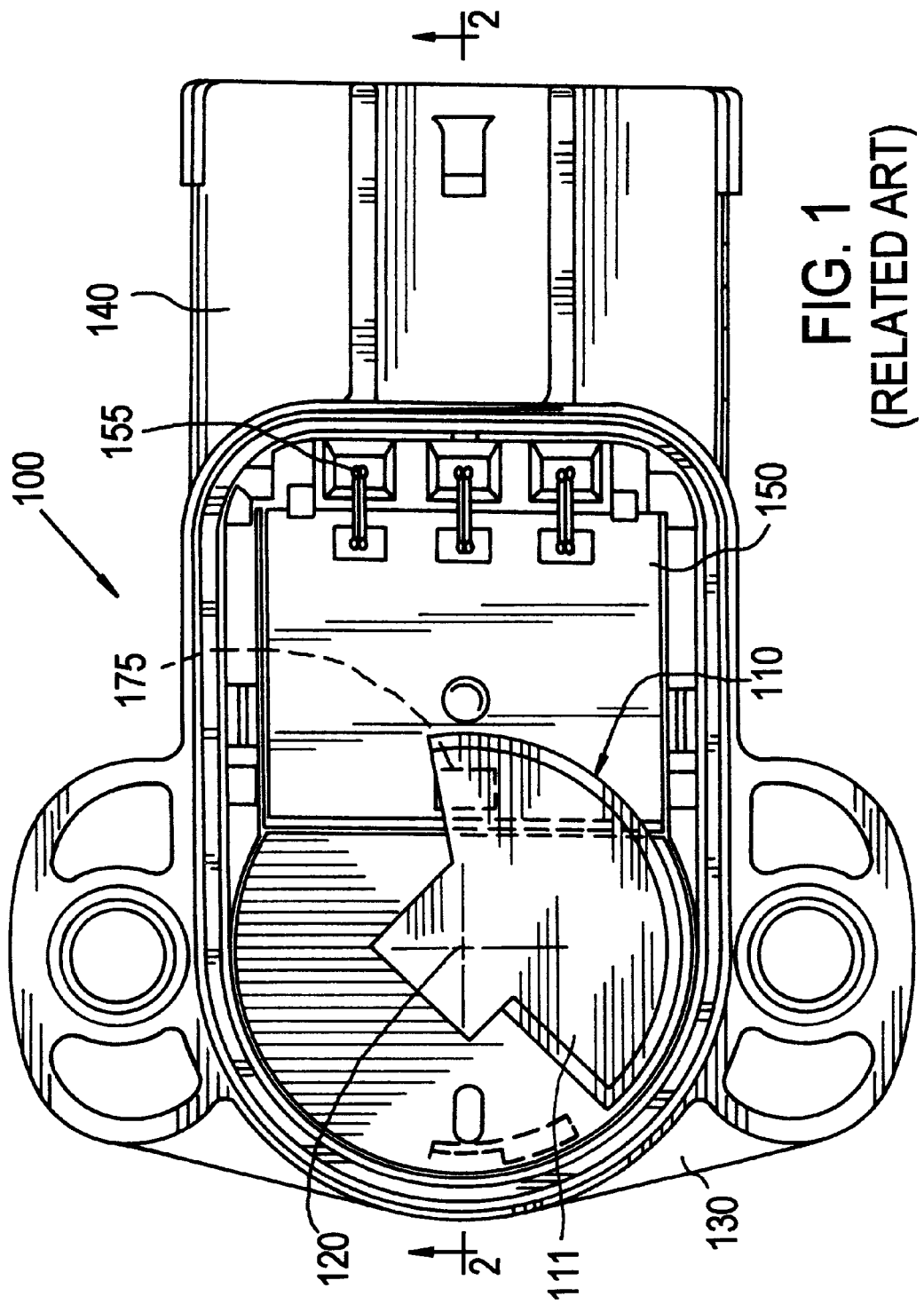
FIG. 1 illustrates a portion of the related art from a top view.
Figure 2:
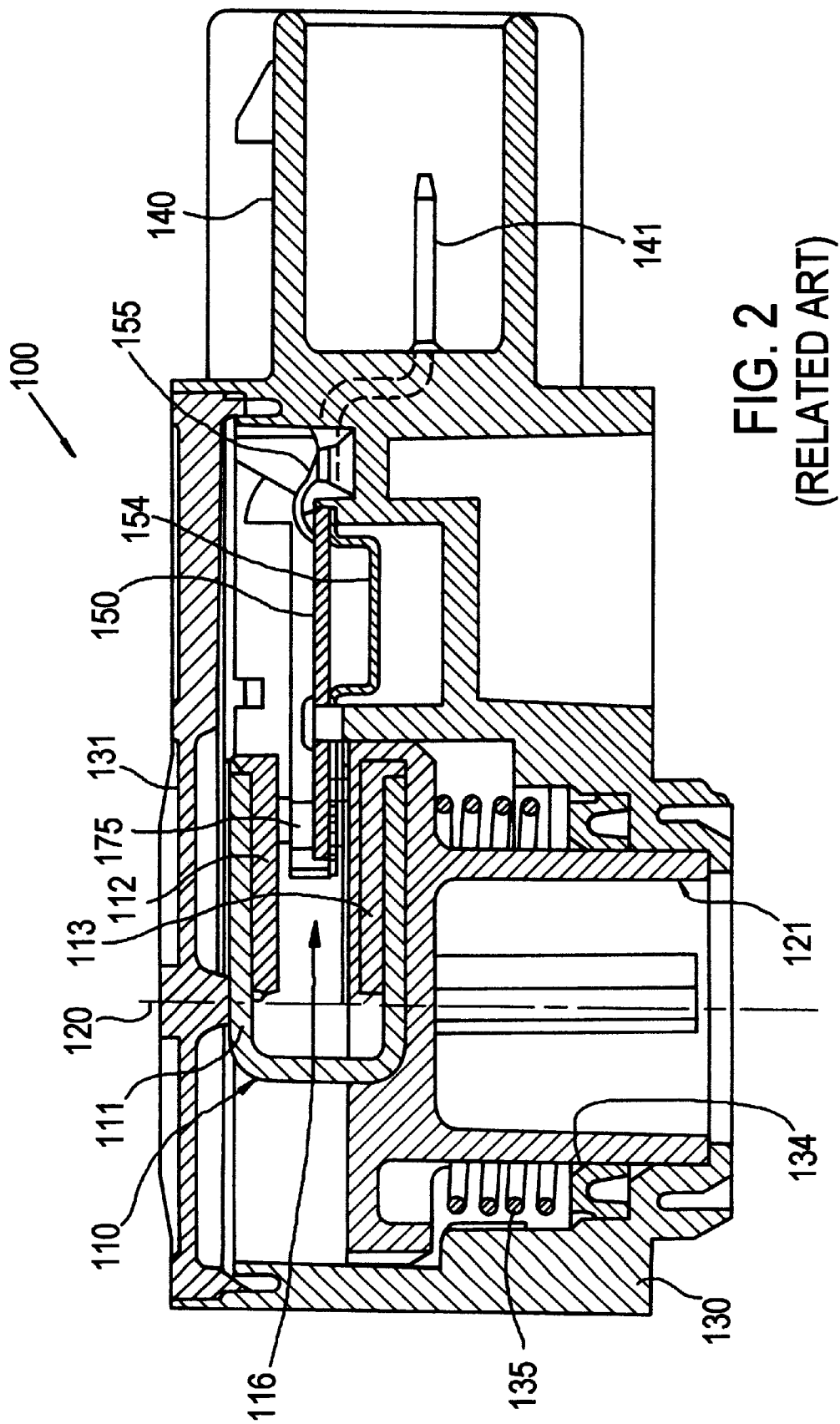
FIG. 2 illustrates the related art from a cross sectional view.

FIGS. 1 and 2 illustrate one example of an appropriate use for the non-contacting position sensor of the related art, as found in U.S. Pat. No. 5,712,561. The NPS of the preferred embodiment is particulary adapted for use in monitoring the rotational position of a component, such as a butterfly valve. FIG. 2 shows a cross section of the NPS of FIG. 1 taken along line 2—2. It is to be appreciated that the assembly shown in FIGS. 1 and 2 represents only one of many possible embodiments within the scope of the present invention. For example, other embodiments of the invention are described in conjunction with subsequent figures. An NPS 100 includes a housing 130 and a magnetic assembly 110. The magnetic assembly 110 includes a magnetically permeable pole piece 111 and tapered magnets 112 and 113. Two additional tapered magnets are shown in subsequent figures. The pole piece 111 is supported by a base 121. Pole piece 111 is bonded to the magnets 112 and 113 such that an air gap 116 is formed between and bordered by the magnets. As shall be described more fully below the magnets create a magnetic field that varies in a substantially linear fashion. The pole piece 111 is preferably formed from sheets of magnetically permeable material such as stainless steel. As illustrated in FIGS. 1 and 2, the sensor 100 detects rotary motion about an axis 120. The rotor cup 121 is designed to engage a shaft extending from the component (not shown) whose position is to be monitored. The base or rotor cup 121 therefore rotates as the shaft and component rotate. The pole piece 111 is rigidly affixed to the rotor cup 121 and rotates as well. The rotor cup 121 may be retained in position using the housing 130, spring 135, and cover 131. The pole piece 111 is roughly a portion of a circle that rotates about axis 120. Rotation of the pole piece 111 moves the magnets as well. Within the air gap 116 formed between the magnets 112, 113 is a magnetic flux sensor, such as a Hall effect device 175. The Hall effect device 575 is carried upon a hybrid circuit substrate 150. The Hall effect device 575 should preferably be positioned toward the center of the air gap 116 to avoid any edge irregularities in the magnetic field created by the magnets 112 and 113. The Hall effect device 175 and hybrid circuit substrate 150 are stationary while the magnets rotate about the axis 120. The hybrid circuit substrate 150 may be attached to the housing 130 using heat staking or similar methods. The circuit substrate 150 also carries circuitry within a tray 154. The tray 154 may act as a container for the materials necessary to protect the circuitry. The circuit substrate 150 is electrically connected to electrical terminals 141 via wires 155. The electrical terminals 141 is located in a connector 140 which allows for interconnection with a standard mating connector. As the magnetic field generated by the magnets 112 and detected by the Hall effect device varies with rotation, the signal produced by the Hall effect device 175 changes accordingly, allowing the position of the component to be monitored to be ascertained.

Figure 3:
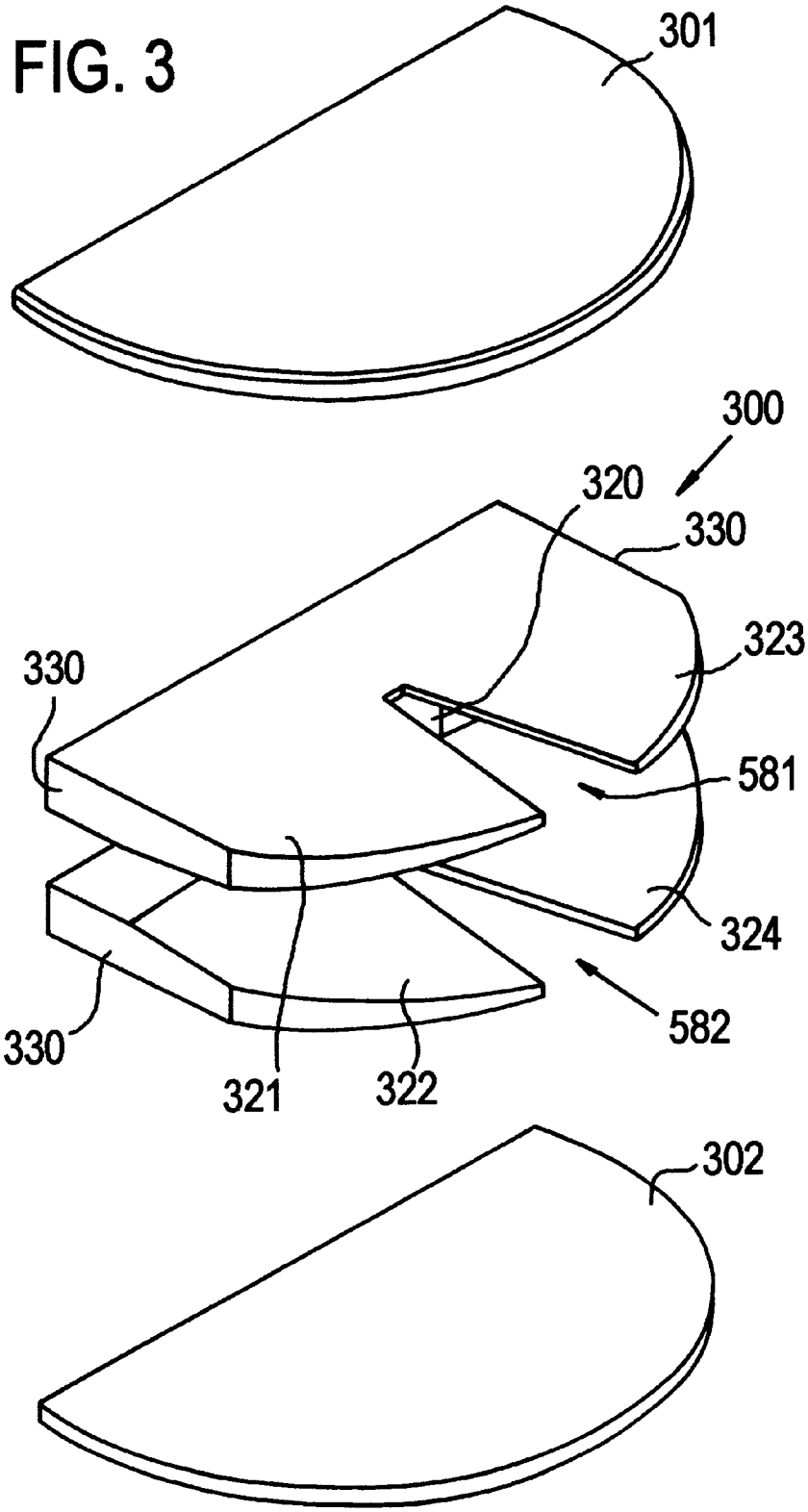
FIG. 3 illustrates an exploded view of a magnet assembly and pole piece in accordance with the preferred embodiment of the present invention.
Figure 4:
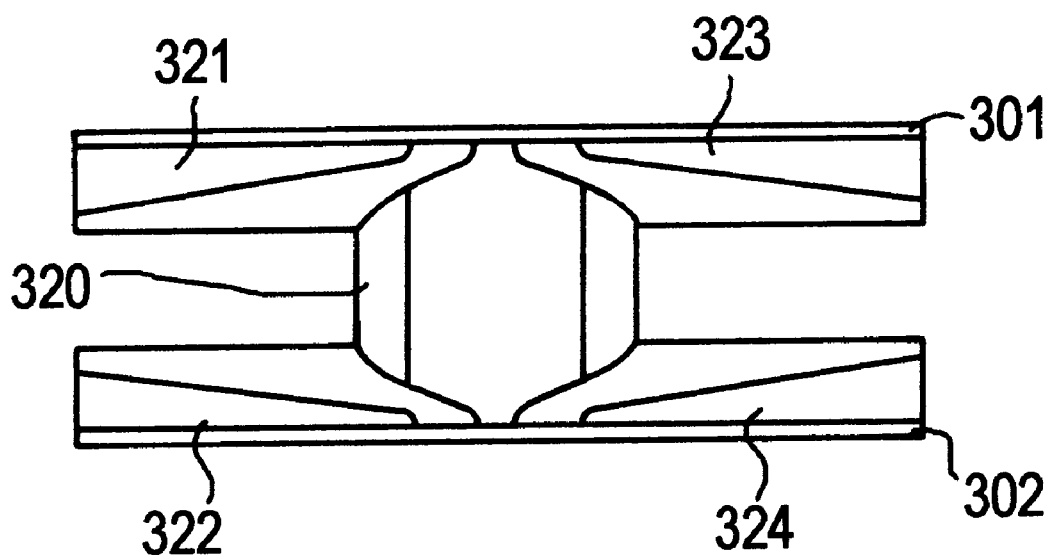
FIG. 4 illustrates a front view of the magnet assembly from FIG. 3.

FIGS. 3 and 4 illustrate the magnet assembly 300 and pole pieces. A first plate 301 is affixed to the top of the magnet assembly. A second plate 302 is affixed to the bottom of the magnet assembly 300. The plates 301 and 302 define pole pieces. They are preferably magnetically permeable, and may be injection molded to the respective magnet portions. In accordance with the preferred embodiment, the magnet assembly 300 comprises four tapered magnet regions or portions 321, 322, 323, and 324, and a magnetic spacer 320.

In accordance with the preferred embodiment, the four tapered magnet regions 321, 322, 323, and 324 are all formed of bonded ferrite or other magnetic material. Alternatively, the four tapered magnet portions 321, 322, 323 and 324 may be constructed as two separate magnets, each having two portions. In this alternative, magnet portions 321 and 323 could comprise portions of one magnet, while magnet portions 322 and 324 could comprise portions of another magnet. The spacer 320 may be omitted, in which case it may be advisable to provide a connecting portion or backstrap as part of the pole piece to rigidly connect the first plate 301 and the second plate 302. If the magnet spacer 320 is used, the first plate 301 and the second plate 302 are not required for structural reasons and may be omitted, although the plates 301 and 302 serve the purpose of intensifying the magnetic flux produced by the four tapered magnet regions 321, 322, 323, and 324 and, for that reason, should generally be used. The magnet assembly 300 may optionally also include straight edges 330. These straight edges 330 facilitate handling the magnet assembly 300 during manufacturing and processing. The four tapered magnets 321, 322, 323, and 324 are magnetized such that the tapered magnets 321, 322, 323, and 324 receive polarities.

Figure 5:
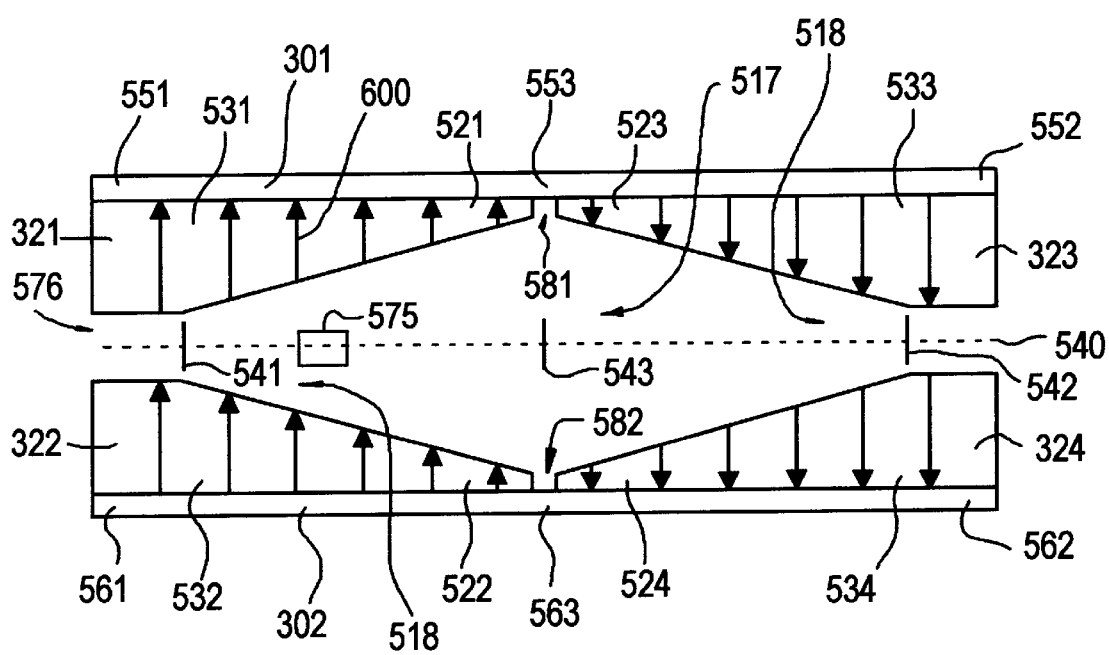
FIG. 5 illustrates a cross sectional view of a linear position sensor design, and also schematically illustrates the operation of a rotationally operating position sensor.

FIG. 5 illustrates a cross sectional view of a linear position sensor design, and also schematically illustrates the operation of a rotationally operating position sensor. The pole pieces include a first plate 301 and second plate 302. The first plate 301 has a first end 551, a second end 552, and a middle 553. The second plate 302 likewise has a first end 561, a second end 562, and a middle 563. It is to be appreciated that the first plate 301 and second plate 302 may be of any shape, and the reference to "ends" is used for purpose of demonstration, not to limit the scope of configurations possible within the scope of the present invention.

The first magnet region 321 has a thin end 521 and a thick end 531. The first magnet region 321 is affixed to the first plate 301 such that the thin end 521 is proximate to the middle 553 of the first plate 301, while the thick end 531 is proximate to the first end 551 of the first plate 301. The first magnet 501 produces a varying magnetic flux field as indicated by vectors 600 in FIG. 5. The polarity of the magnetic field generated by the first magnet region 321 is indicated by the upward direction of the vectors 600. The polarity of the magnetic field generated by the first magnet 501 is denoted the first polarity and defined as positive. Likewise, the strength of the magnetic flux field is indicated by the length of the vectors. As can be seen in FIG. 5, the magnetic flux field generated by the first magnet region 321 decreases in strength from the thick end 531 to the thin end 521. Magnet regions 322, 323 and 324 are similarly designed as illustrated. The third magnet region 323 and the first magnet region 321 may be described as lineraly or symmetrically adjacent, or simply adjacent. Likewise, the second magnet region 322 and the fourth magnet region may be described as linearly or symmetrically adjacent, or simply adjacent.

In another embodiment, a first magnet gap 581 may separate the thin end 521 of the first magnet region 321 from the thin end 523 of the third magnet portion 323. A second magnet gap 582 separates the thin end 522 of the second magnet portion 322 from the thin end 524 of the fourth magnet portion 524. While the magnet gaps 581 and 582 may be omitted without departing fom the scope of the present invention, they serve important functions. The magnet gaps 581 and 582 increase the linearity of the magnetic field within the airgap 516. As a practical matter, the thin end of a magnet will always have a finite thickness and generate a non-zero magnetic field. If the thin ends of two magnets having opposite polarities are immediately adjacent, there will be a discontinuity of the combined magnetic field about the symmetry point 543. By providing a gap between adjacent thin ends of the tapered magnets, this discontinuity and other problems affecting linearity of sensor output, as defined in FIG. 6 may be avoided.

Further, the gaps 581 and 582 allow for a consistent neutral zone, at around point 543 independent of magnetizing property variations, which aids lineanty of sensor output. The magnet gaps 581 and 582 may be created during the molding of the magnets. If the magnets are formed individually, the gaps 581 and 582 may be formed by appropriately positioning individual magnets. Alternatively, magnetic material may be removed to create the gaps after the magnets have been formed.

The air gap 516 is formed between the magnet regions 321, 322, 323 and 324. As can be seen in FIG. 5, the air gap 516 is essentially diamond shaped, with the central portion of the air gap 517 being larger than both ends 518 of the air gap 516. A magnetic flux sensor such as a Hall effect device 575 is positioned within the air gap 516. The relative movement between the Hall effect device 575 and the magnetic assembly causes the position of the Hall effect device 575 within the air gap 516 to vary along line 540. The magnetic field within the air gap 516 is the sum of the magnetic fields generated by the first magnet region 326, the second magnet region 322, the third magnet 323 and the fourth magnet region 324. The polarity and strength of the combined magnetic field varies along the line 540. As a magnetic field of the first polarity, such as that generated by the first magnet region 321 and the second magnet region 322, is defined as positive and a magnetic field of the second polarity, such as that generated by the third magnet region 323 and the fourth magnet region 324, is defined as negative, the magnetic field detected by the Hall effect device 575 as it moves along the line 540 will be large and positive at the first end 541 of the air gap and decrease substantially linearly as it approaches the middle 543 of the air gap, at which point the magnetic field will be substantially zero. As the Hall effect device 575 travels along the line 540 from the middle 543 to the second end 542 of the air gap 516 the polarity of the magnetic field detected will be negative but of a substantially linearly increasing magnitude.

Figure 6:
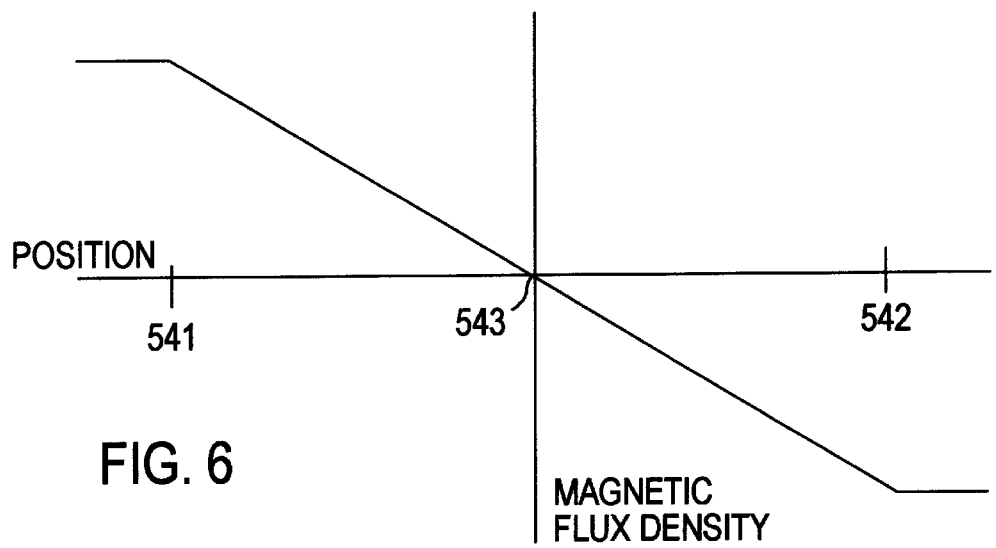
FIG. 6 illustrates magnetic flux density in the present invention as a function of the component position.

This variance of magnetic field polarity and strength as a function of a linear position is illustrated in FIG. 6. FIG. 6 is a graph in which the x axis denotes the position of the Hall effect device 575 along line 540 and the y axis illustrates the magnetic flux density detected by the Hall effect device 575. As can be seen, the magnetic flux density measured by the Hall effect device 575 at position 541 is high and positive. The magnetic flux density measured at position 542 is of approximately the same magnitude as at position 541 but of opposite polarity, and denoted as negative in FIG. 6. The measured magnetic flux density is substantially linear between position 541 and position 542, with the point of substantially zero magnetic flux density being located at position 543, the midpoint between 541 and the symmetry point on the x-axis. The use of four magnet regions in the present invention allows for the creation of relatively strong magnetic fields and accordingly increased linearity of the magnetic field within the air gap 516. The signal produced by the Hall effect device 575 is proportional to the magnetic flux density it measures within the air gap 516. Accordingly, the increased linearity of a magnetic field within the air gap 516 results in an increased linearity of output of the Hall device 575 and increased accuracy and precision of position readings.

In accordance with the present invention, a non-contacting position sensor is provided having increased linearity of magnetic field and resulting signal as well as decreased signal variance due to temperature changes. This allows the linear output of the magnet regions, between points 541 and 542, to rotate about substantially zero Gauss, point 543. The sensitivity of the field sensing device also rotates about zero Gauss point. This improves the ability of the sensor to compensate for temperature changes by eliminating previously needed circuitry and additional processing complexities. In its broader aspects, the invention may be viewed as a magnetic circuit comprising 1) four tapered magnet regions which generate a magnetic field, 2) an air gap and pole piece that are permeated by the magnetic field, and 3) a magnetic flux sensor which produces a voltage proportionate to the magnetic field at its location. A non-contacting position sensor in accordance with the present invention may be affixed to the component to be monitored in any appropriate fashion.

It is to be appreciated that numerous variations from the example embodiments described herein may be made without parting from the scope of the invention. One possible alternative embodiment would omit two of the magnet regions. For example, magnet regions 321 and 323 would be affixed to plate 301, but magnet regions 322 and 324 would not be included. The resulting air gap 516 would have a central portion larger than the ends. This "half sided" embodiment would allow for a smaller sized sensor requiring fewer materials to construct.

It is noted that a wide variety of materials may be used to construct the magnet regions and the pole pieces. The spacer may be included in the magnet assembly or omitted. Likewise, if pole pieces are used it may opionally include a backstrap or other connecting portion to join the first and second plates. The magnets themselves may be individual magnets, or may be magnetic portions of larger magnets. The magnet gaps between the thin ends of adjacent magnets or magnet regions may be formed in any of a variety of ways or omitted altogether. The magnet assembly may be substantially pie shaped, circular, linear or may be any of a number of other shapes. For example, the magnet assembly may be substantially rectangular when the invention is used to monitor a component that moves laterally or linearly, as opposed to rotationally. While the magnet assembly preferably includes a magnetically permeable pole piece, a pole piece is not required. The precise type of apparatus the position sensor is attached to is immaterial to the present invention. Likewise, the particular type and variety of magnetic flux sensor used in connection with a non-contacting position sensor in accordance with the present invention is immaterial. A variety of mechanisms may be used to connect the magnet assembly to the component to be monitored in addition to the rotor cup.

Alternatively, the Hall effect device could be connected to the component to be monitored, with the magnet assembly remaining substantially stationary. The electrical connections and the methods of establishing them may vary from those shown in accordance with the preferred embodiment. One skilled in the art will likewise readily ascertain numerous other variations that may easily be made without departing from the spirit and scope of the present invention.

What is claimed is:

1. A sensor for sensing movement of an attached movable object, comprising:
    a) a diamond shaped air gap, having a thick central air gap portion and a pair of thin ends;
    b) a magnetic flux sensor positioned in the air gap; and
    c) a first and second magnet positioned on opposite sides of the air gap, each of the magnets having a thin central magnet region and a pair of thick ends, wherein the thin central magnet region is adjacent with the thick central air gap portion, the first and second magnets having a first polarity on one side of the thin central magnet portions and an opposite second polarity on the other side of the thin central magnet portions.

2. The sensor of claim 1, wherein the first and second magnets each further comprise a magnet gap in the central portions.

3. The sensor of claim 1, further comprising:
    d) a magnetically permeable first plate affixed to the first magnet; and
    e) a magnetically permeable second plate affixed to the second magnet.

4. The sensor of claim 3, further comprising:
    d) a spacer joining the first and second magnet.

5. The sensor of claim 3, wherein the magnetic flux sensor comprises a Hall effect device.

6. The sensor of claim 3, wherein first and second magnets are rigidly affixed to the movable object, such that when the object moves the first and second magnets move relative to the magnetic flux sensor.

7. The sensor of claim 6, wherein the movable object moves rotationally.

8. The sensor of claim 6, wherein the movable object moves linearly.

9. The sensor of claim 3, wherein the magnetic flux sensor is rigidly affixed to the movable object, such that when the object moves the magnetic flux sensor moves relative to the first and second magnets.

10. The sensor of claim 9, wherein the movable object moves rotationally.

11. The sensor of claim 9, wherein the movable object moves linearly.

12. A non-contacting position sensor comprising:
    a) an air gap having a first end, a second end, and a middle;
    b) a Hall effect device moveably positioned within the air gap;
    c) four magnetically polarized magnet portions positioned within the air gap each comprising:
        c1) a thick end;
        c2) a thin end;
        c3) wherein the thickness of each magnet portion increases substantially linearly from the thin end to the thick end; and
        c4) wherein two magnet portions have a first polarity and extend from the first end of the airgap to the middle of the airgap, and wherein two magnet portions have a second polarity substantially opposite the first polarity and extend from the second end of the air gap to the middle of the airgap.

13. The sensor of claim 12, further comprising a pole piece to cary the four magnetic portions, the pole piece being constucted of a magnetically permeable material.

14. The sensor of claim 13, wherein the Hall effect device is rigidly affixed to a component whose position is to be monitored, such that when the component moves the Hall effect device moves relative to the pole piece.

15. The sensor of claim 13 wherein the pole piece is rigidly affixed to a component whose position is to be monitored, such that when the component moves the pole piece moves relative to the Hall effect device.

16. The sensor of claim 15, wherein the component moves rotationally.

17. The sensor of claim 15, wherein the component moves linearly.

18. A magnetic position sensor for attachment to an object whose position is to be sensed comprising:
    a) a first v-shaped magnet having a pair of magnet regions of opposing polarity, each magnet region having a thick end and a thin end, the thickness of each magnet portion increases linearly from the thin end to the thick end such that the strength of a flux field increases linearly from the thin end to the thick end;
    b) a second v-shaped magnet having a pair of magnet regions of opposing polarity, each magnet region having a thick end and a thin end, the thickness of each magnet portion increases linearly from the thin end to the thick end such that the strength of a flux field increases linearly from the thin end to the thick end, the second v-shaped magnet juxtaposed to the first v-shaped magnet, the first and second v-shaped magnets attached to the object and moveable as the object moves;
    c) an airgap formed between the first and second v-shaped magnets; and
    d) a magnetic field sensor positioned in the air gap for sensing the flux field of the first and second magnets as the object moves, the magnetic field sensor generating an electrical signal proportional to the strength of the flux field and indicative of the position of the object.

19. The position sensor according to claim 18, wherein a magnet gap is located between the thin ends of the magnet regions, the magnet gap increasing linearity of the electrical signal.

20. The position sensor according to claim 19, wherein a spacer is located between the first magnet and the second magnet.

21. The position sensor according to claim 20, wherein a first pole piece is attached to the first magnet and a second pole piece is attached the second magnet.

22. The position sensor according to claim 21, wherein the magnetic field sensor is a hall effect device.

23. The position sensor according to claim 19, wherein the magnet regions of the first and second magnets that are opposed from each other across the airgap are of the same polarity.

24. A magnetic position sensor for attachment to an object whose position is to be sensed comprising:
   a) a first, second, third and fourth magnet region, each magnet region having a thick end and a thin end, the thickness of each magnet region increasing linearly from the thin end to the thick end such that the strength of a flux field increases linearly from the thin end to the thick end, the first and second magnet regions connected to each other at the thin ends, the third and fourth magnet regions connected to each other at the thin ends, the first and second magnet regions juxtaposed to the third and fourth magnet regions, the magnet regions attached to the object and moveable as the object moves;
   b) an airgap formed between the first and second magnet regions and the third and fourth magnet regions; and
   c) a magnetic field sensor positioned in the air gap for sensing the flux field of the magnet regions as the object moves, the magnetic field sensor generating an electrical signal proportional to the strength of the flux field and indicative of the position of the object.

25. The position sensor according to claim 24, wherein the first and second magnet regions have opposite polarities.

26. The position sensor according to claim 25, wherein the third and fourth magnet regions have opposite polarities.

27. The position sensor according to claim 26, wherein the first and third magnet regions have the same polarities and the second and fourth magnet regions have the same polarities.

28. The position sensor according to claim 24, wherein a magnet gap is located between the thin ends of the magnet regions, the magnet gap increasing linearity of the electrical signal.

29. The position sensor according to claim 28, wherein a spacer is located between the first and second magnet regions and the third and fourth magnet regions.

30. The position sensor according to claims 29, wherein a first pole piece is attached to the first and second magnet region and a second pole piece is attached the third and fourth magnet region.

31. The position sensor according to claim 24, wherein the magnetic field sensor is a hall effect device.

32. The position sensor according to claim 24, wherein the airgap is diamond shaped.

* * * * *